United States Patent [15] 3,684,203

Tollkuhn [45] Aug. 15, 1972

[54] METHOD OF LOADING CASSETTES

[72] Inventor: Arthur W. Tollkuhn, San Jose, Calif.

[73] Assignee: Memorex Corporation

[22] Filed: Sept. 21, 1970

[21] Appl. No.: 74,048

[52] U.S. Cl. ....................242/67.3, 242/55, 242/198, 242/199

[51] Int. Cl. ............................................G11b 23/10

[58] Field of Search.....242/67.1, 197, 198, 199, 200, 242/210, 71.2, 75.3

[56] References Cited

UNITED STATES PATENTS

| | | | |
|---|---|---|---|
| 2,941,741 | 6/1960 | Bilsback | 242/199 |
| 3,458,158 | 7/1969 | Ohira | 242/198 |
| 3,514,050 | 5/1970 | Yamamoto et al. | 242/198 |
| 2,601,955 | 7/1952 | Hardenberg | 242/199 |

*Primary Examiner*—George F. Mautz
*Assistant Examiner*—Gregory A. Walters
*Attorney*—Limbach, Limbach & Sutton

[57] ABSTRACT

A method of placing tape in a cassette during manufacture. Tape hubs are held above the flanged holes on the bottom half of a cassette in which the hubs will ride. A length of tape is attached to one of the hubs and is rolled onto the hub by rotating the hub. A portion of the same length of tape is attached to the other hub so that the tape runs between the hubs. The tape is pulled over the front of the cassette bottom, allowing the rolled up tape to unwind as much as required. The hubs and tape are then allowed to rest on the cassette bottom and the hubs are rotated to make up tape slack. Due to the construction of the bottom cassette portion, the tape does not meet any obstruction and will be threaded in the desired path.

3 Claims, 8 Drawing Figures

INVENTOR
ARTHUR W. TOLLKUHN
BY
Limbach, Limbach & Sutton
ATTORNEYS

INVENTOR.
ARTHUR W. TOLLKUHN
BY
Limbach, Limbach & Sutton
ATTORNEYS

INVENTOR.
ARTHUR W. TOLLKUHN
BY
Limbach, Limbach & Sutton
ATTORNEYS

INVENTOR
ARTHUR W. TOLLKUHN
BY
Limbach, Limbach & Sutton
ATTORNEYS

METHOD OF LOADING CASSETTES

BACKGROUND OF THE INVENTION

This application relates generally to a method of manufacture and more particularly to a method of manufacturing a twin-hub tape cartridge of the coplanar tape, generally known as a cassette. The physical configurations of the assembled cassette are well known and are defined by specific standards adopted by various engineering and trade associations. See, for example, "A Tape Cassette Standard" by Edward R. Hanson in the Journal of the Audio Engineering Society, Vol. 16, No. 4, October 1968, pp. 430 ff. Although the invention will be described with respect to the manufacture of a cassette, it will be apparent to those of ordinary skill in the art that the invention is also applicable to the manufacture of other types of tape and film cartridges.

As the market demand for cassettes increases, it is desirable to have a simple, fast, and low-cost yet reliable method of manufacture. Preferably the method should use automated production line techniques.

A significant problem in perfecting an automated manufacturing technique is the introduction of the magnetic tape into the cassette. In the final product, the tape, wound around a first rotatable hub, is threaded past guide means to a second rotatable hub. Because of the intricate path taken by the tape and the necessity to gently handle the thin, fragile tape, the tape insertion has been handled heretofore by human operators.

SUMMARY OF THE INVENTION

A method of manufacture is provided whereby the bottom portion of the cassette body is fitted over a pair of rotaable spindles on a moving assembly line. The spindles extend upright through two holes in the cassette bottom and a hub having a pin slot in its periphery is placed on the end of each spindle. Leader tape from a supply source is pinned to the leading hub of a cassette and the spindle is rotated to wind up a foot or two of leader. The leader is then pinned to the trailing hub of that cassette and the leading hub of the next cassette on line and that portion of leader tape between the hubs of adjacent cassettes is cut off and discarded. A pair of arms then engages the leader tape of the leading cassette, pulling it from the leading hub and positioning it over the channel through which the tape must pass in the assembled cassette. The cassette is raised, dropping the hubs to seat them in the cassette bottom, and the arms are removed leaving the leader into the desired tape path. Upon joining and attaching the top and bottom of the cassette structure the leader may be pulled through a passage in the front of the cassette, cut, and the desired amount of tape spliced between the two ends of leader tape fixed to the hubs. The tape is then wound up by rotating one of the hubs thus completing manufacture of the cassette. The practice of the method is facilitated by the design of the top and bottom portions of the cassette which removes certain portions of the cassette from interference with the leader tape as it is moved outward by the aforementioned arms and is set into place. The design of the cassette halves or subassemblies is the subject of a copending application assigned to the present assignee.

DESCRIPTION OF THE PREFERRED EMBODIMENTS

Figure 1:
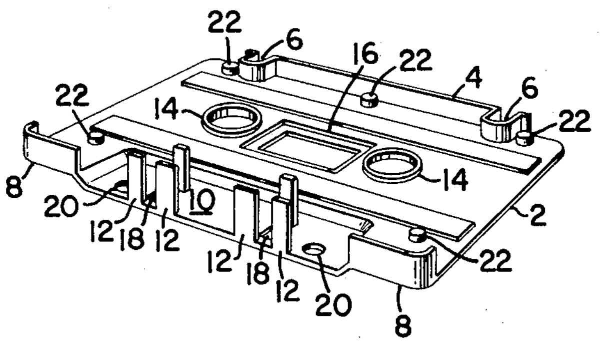
FIG. 1 is a perspective view of the top or cover portion of the cassette to be assembled according to the method of the invention.
Figure 2:
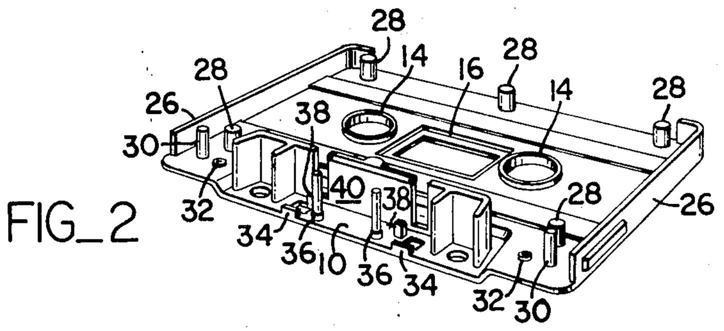
FIG. 2 is a perspective view of the bottom portion of the cassette to be assembled according to the method of the present invention.

Referring now to FIGS. 1 and 2, the top or cover and bottom portions or subassemblies, respectively, of a cassette to be assembled are shown as unitary pieces of molded plastic. Although the assembled cassette is essentially identical to prior art cassettes, the top and bottom portions differ from those of prior design. As will be seen hereinafter, this design facilitates the practice of the method of manufacture according to this invention and is the subject of a copending application.

The assembly 2 in FIG. 1 is a generally rectangular plane sheet having rounded edges and having longitudinal dimensions exceeding the transverse dimensions. A perpendicular wall 4 having a pair of inwardly dimpled portions 6 extending along the top rear edge of the assembly from a point near the left rear edge to a point near the right rear edge. Two perpendicular wall portions 8 extend along the left and right front edge of the assembly. A slightly depressed trapezoidal portion 10 is located centrally along the front portion of the assembly between walls 8. Four perpendicular fingers 12 are disposed symmetrically in pairs along the front edge of the portion 10. The fingers 12 and wall portions 8 have heights substantially equal to the thickness of the assembled cassette. A pair of flanged circular holes 14 are located in the left and right central portions of the assembly for engaging hubs that will be inserted and a rectangular hole or window 16 from viewing the tape on each hub in a finished cassette is located between holes 14. A pair of square holes 18 for insertion of holding fingers during cassette use in a player (not shown) are located symmetrically in the depressed portion 10 centered behind each pair of fingers 12. Circular holes 20 for insertion of a capstan are located symmetrically in the depressed portion 10 a small distance from the edge of assembly 2 and between fingers 12 and walls 8. Five short perpendicular cylindrical posts 22 are disposed in the top of the assembly 2; one is located near each corner of the assembly and the fifth is centered near the rear of the assembly.

Bottom assembly 24 is designed to mate with top portion 2 and is a rectangular substantially planar sheet. A pair of perpendicular side walls 26 extend from the rear of the assembly to near the front edge. When fit together with top assembly 2, walls 4, 8, and 26 from a unitary side structure that encloses the cassette except for an open portion between walls 8 at the front of the cassette. Five cylindrical posts 28 are located to abut posts 22 when the assemblies are joined in order to provide structural rigidity to the cassette. A pair of flanged holes 14 and a rectangular hole or window 18 are located in the same positions as in the top assembly A pair of perpendicular pins 30 are located near the front left and right edges of the assembly 24 in order to provide tape guidance. A pair of receptacles 32 are provided adjacent and centrally of pins 30 for insertion of metal pins and rollers during the assembly. If desired the rollers may be omitted, thus, receptacles 32 could be omitted. A depressed portion 10 as in the top assembly is also provided. A pair of short fingers 34 are located to fit between each pair of fingers 12 in the top assembly. A pair of tape guide pins 36 are located centrally in the depressed portion 10. A pair of cubes 38 are located slightly behind and to the left and rights of pins 36. A perpendicular double U-shaped wall 40 is located to the rear of depressed portion 10. Wall 40 has a long portion parallel to the front edge of assembly 24 and has two U-shaped sections opening to the front of the assembly at the left and right ends of the depressed portion. It will be noted that both the top and bottom portions of the cassette are symmetrical about a line running from front to rear through the center of the plane of each section.

Figure 3:
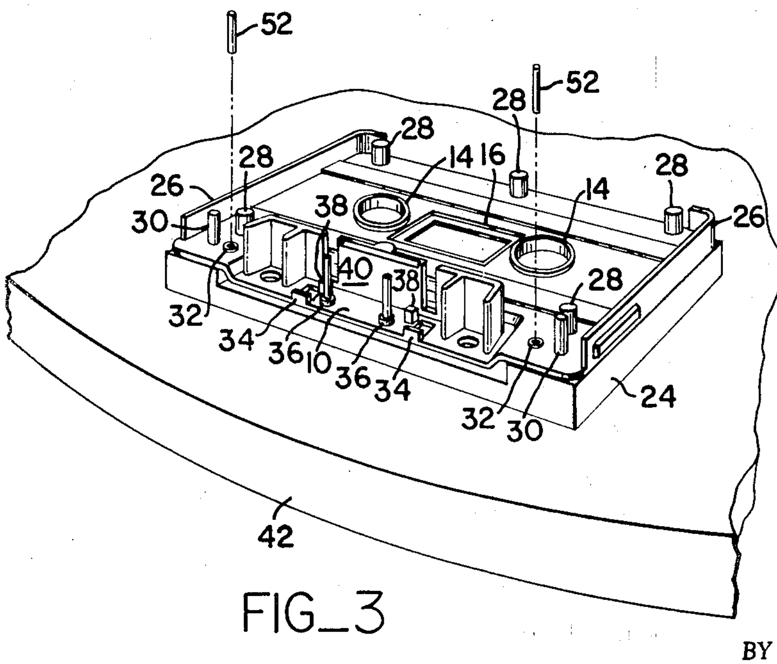
FIG. 3 is a perspective view of the bottom portion of the cassette showing one of the steps of assembly on the apparatus of FIG. 2.

Referring now to FIG. 3 of the drawings, the method of assembling cassettes according to this invention is preferably performed on automatic apparatus with different assembly steps performed at different rotary positions of a turntable 42. The details of the assembly mechanism are not the subject of the present invention and are disclosed only to the extent necessary to facilitate an understanding of the method of the invention. Suitable assembly mechanisms, drive devices, parts hoppers and the like can be obtained on the market.

As indicated in FIG. 3, pins 52 are inserted in sockets 32 of the cassette bottoms at one assembly station. This step is optional depending on whether rollers (described hereinafter) are desired to provide easier passage for the magnetic tape. Many commercial cassettes omit the rollers.

Figure 4:
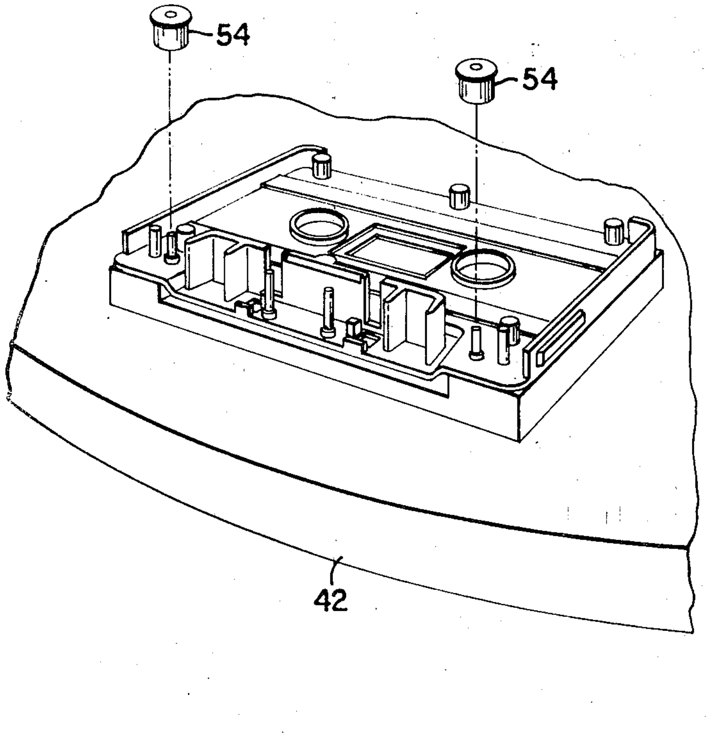
FIG. 4 is a perspective view of the bottom portion of the cassette showing a further step of assembly.

At a succeeding station rollers 54 are supplied and fitted over pins 52 as shown in FIG. 4.

Figure 5:
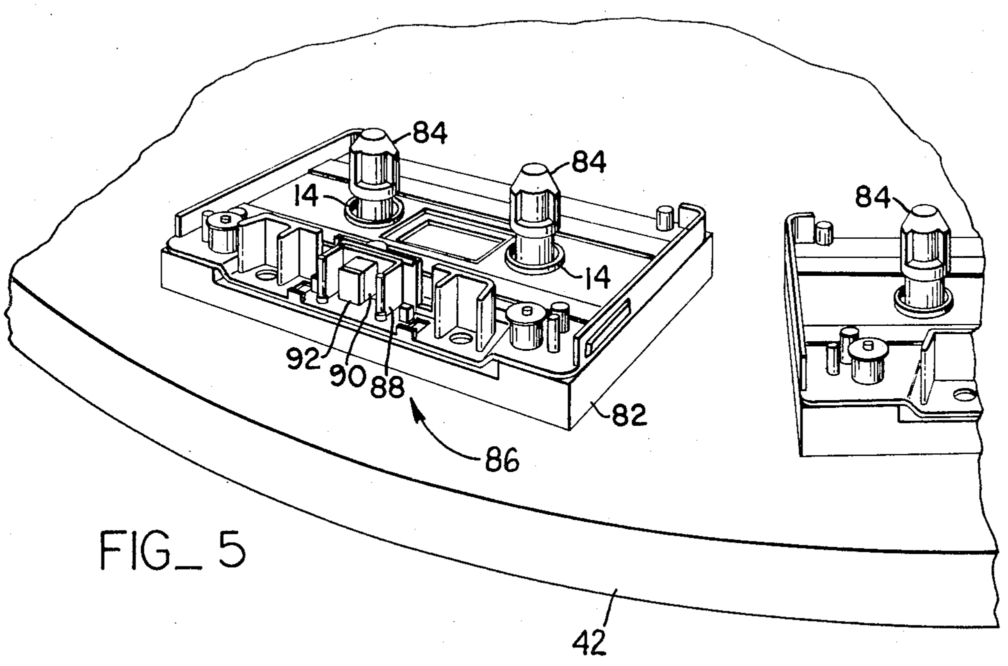
FIG. 5 is a perspective view of the bottom portion of the cassette in one stage of assembly.

FIG. 5 shows a bottom subassembly nested in a rectangular holder 82 on turntable 42. A pair of spindles 84 on turntable 42 protrude upward through the flange holes 14. The spindles are rotatable and their purpose will become clear in the discussion hereinafter.

A U-shaped shield assembly 86 is inserted between pins 36 and wall 40. The assembly 86 includes a metallic U-shaped portion 88, a foam cube 90 fixed to the rear wall of portion 88, and a pressure pad 92. In a completed cassette, metallic portion 88 provides a magnetic shield so that the record head that engages the tape opposite pad 92 does not pick up hum or other stray magnetic fields.

Figure 6:
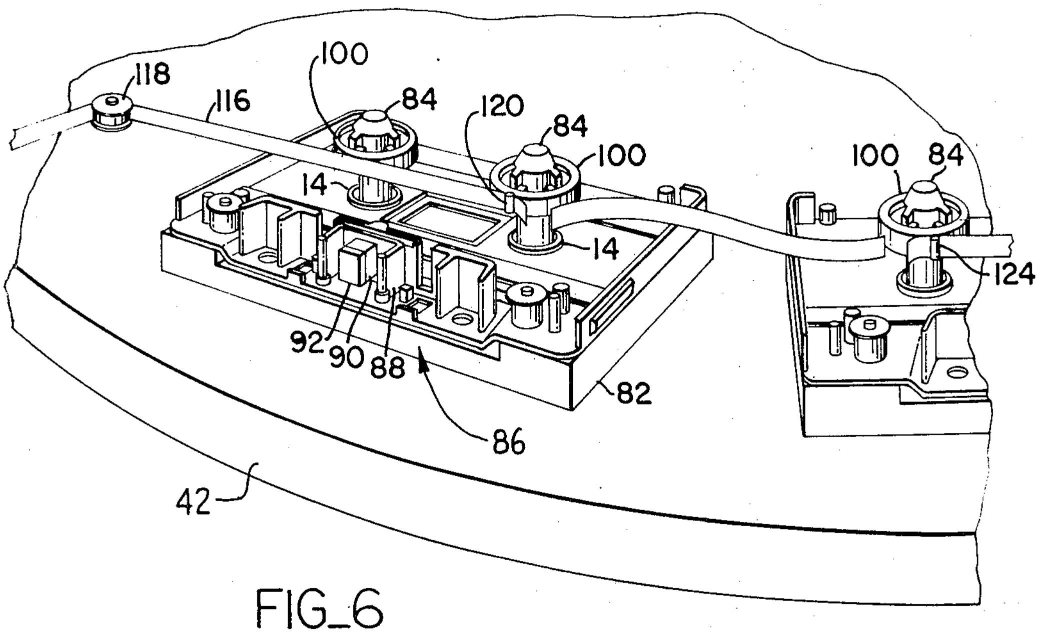
FIG. 6 is a perspective view of the bottom portion of the cassette showing a succeeding step in assembly method of the invention.

As illustrated in FIG. 6, left and right hubs 100 are placed on spindles 84. Hubs 100 are conventional cassette hubs of toroidal shape having inward facing teeth to engage the spindle drives. The inner portions on both sides are indented to ride and rotate easily on the flanges of holes 14.

A supply reel of leader tape 116 is threaded through a series of rollers 118 and as shown in FIG. 6, is attached to the leading hub of the cassette bottom subassembly. A peg or pin 120 is inserted in a notch in the periphery of hub 100 to hold the leader tape 116. Any leader tape downstream from the hub is cut off as scrap.

While turntable 42 is indexing, about 26 inches of leader is wound onto the leading hub of the cassette bottom subassembly by rotating leading spindle 84.

After the leader is wound onto the leading hub it is fastened to the trailing hub. The trailing hub is then rotated 180° clockwise by the spindle 84 in order to relieve tension on the pin connection in subsequent steps.

Figure 7:
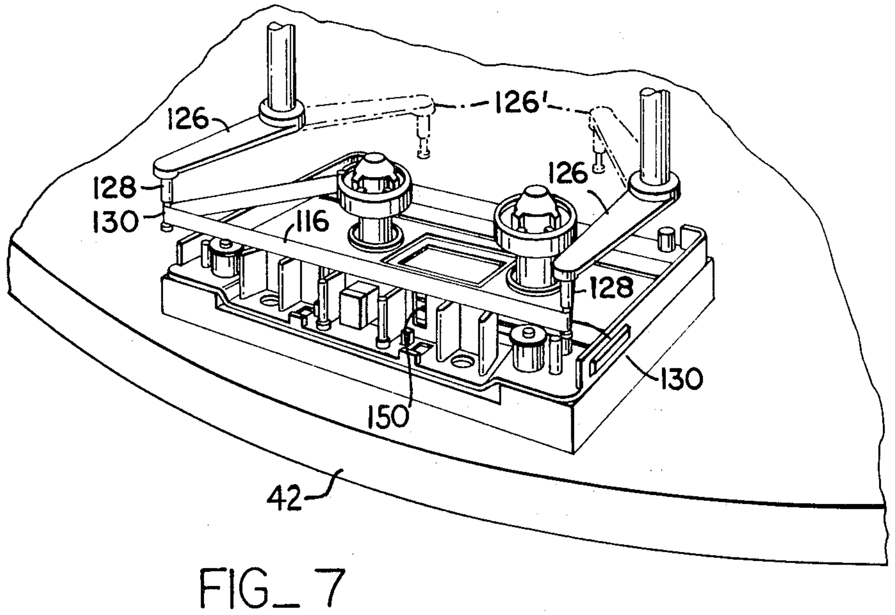
FIG. 7 is a further perspective view of the bottom portion of the cassette undergoing a further step of assembly according to the invention and illustrating a slightly modified form of cassette.

Referring to FIG. 7, a pair of arms 126 mounted above turntable 42 having downward extending fingers 128 with notched portions 130 to engage the leader tape 116, rotate outward from their initial position 126' thereby engaging the leader tape and pulling it outward. The trailing hub is not allowed to rotate by the spindle; however, the spindle holding the leading hub is free to rotate and a portion of the 26 inches of tape that was rolled up is allowed to pay out. In this situation, the tape 116 and hubs 100 are positioned above the plane of the cassette bottom so that the tape 116 can move outwardly over the top of wall 40 (compare FIG. 1). When the arms 126 reach the position illustrated in full line in FIG. 7, the part of the tape 116 between the pins 128 lies outside the ultimate tape path, and the parts of the tape between each pin 128 and the adjacent hub 100 lies directly above the tape path.

Figure 8:
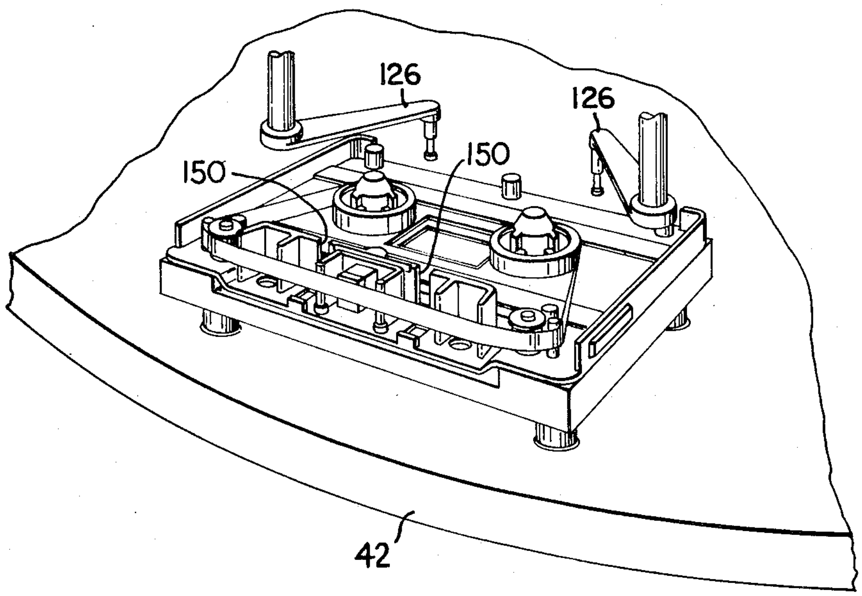
FIG. 8 is a further perspective view of the bottom portion of the cassette showing yet another step of assembly according to the instant invention.

With the parts in the position of FIG. 7, the bottom cassette half is raised until the flanged openings 14 (FIG. 1) engage the hubs 100, and then the arms 126 are rotated inwardly toward the condition of FIG. 8. Rotation of the arms 126 can be stopped with the pins 128 inside the tape path adjacent to wall 40, but preferably, slots 150 are provided in the wall 40 to permit the pins 128 to pass therethrough.

Where slots 150 are not provided, the cassette bottom half with its supported tape 116, hubs 100 and drive spindles 84 are moved down to free the pins 128, and then the cassette may be advanced by the turntable 42 to another station where the top cover will be attached in conventional manner. The cassette is advanced to the next station without this downward shifting where the slots 150 are employed.

It will be noted that this method can be practiced with cassettes of conventional design in which the wall portions along the most forward edge of the cassette are located one-half on the top and one-half on the bottom. Where such conventional cassettes are used, the arms 126 and pins 128 are rotated to the exact position where the tape is directly above the tape path and then the cassette bottom half is lifted. This requires that the pins 128 be very precisely controlled to lower the tape into the tape path and then disengage from the tape and retract.

It is for this reason that I prefer to use the method of this invention with the cassettes of my copending application. Where the tape may be pulled by pins 128 to a position well forward of the tape path before being lowered toward the cassette, the method may be performed more rapidly, and less precise control is required for the pins 128. Here the tape is finally moved into the tape path by applying torque to the spindles 84 as the pins 128 retract so that tape tension pulls the tape into its path.

While certain features have been described with detail herein, it will be apparent to one of ordinary skill in the art that many modifications may be made without departing from the spirit of the invention. The scope of the invention is therefore to be limited only by the appended claims.

I claim:

1. In the manufacture of a tape cassette having a sub-assembly including a generally planar base, a pair of generally circular apertures in said base, each aperture having along its circumference a flange adapted to receive and engage a tape reel hub and guide means along one length of the base defining a tape path, the method of placing tape in the sub-assembly comprising the steps of:

a. supporting a tape reel hub above and in axial alignment with each of said apertures, b. attaching a tape to both of said hubs, c. positioning the tape along a path lying in a plane above the plane of the tape path defined by said guide means, slightly longer than said tape path and generally parallel to said tape path, and d. moving the sub-assembly and the hubs relative to each other to bring the hubs into engagement with the flanges along the circumferences of the aperatures in the base and to bring the tape into contact with the guide means.

2. The method of claim 1 in which said step of supporting said hubs is performed by mounting said hubs on spindles, said step of attaching a tape to both of said hubs includes attaching an end of a strip of tape to one of said hubs, rotating said hub, and then attaching said strip of tape to the other hub.

3. The method of claim 1 in which said step of supporting said hubs is performed by inserting a pair of spindles through the apertures in the base and then mounting said hubs on said spindles spindles.

* * * * *